United States Patent [19]

Van Veen et al.

[11] Patent Number: 5,358,917

[45] Date of Patent: Oct. 25, 1994

[54] HYDROCARBON CONVERSION CATALYST

[75] Inventors: Johannes A. R. Van Veen; Johannes K. Minderhoud; Willem H. J. Stork, all of Amsterdam, Netherlands

[73] Assignee: Shell Oil Company, Houston, Tex.

[21] Appl. No.: 968,134

[22] Filed: Oct. 29, 1992

[30] Foreign Application Priority Data

Nov. 1, 1991 [EP] European Pat. Off. ......... 91202861.0

[51] Int. Cl.⁵ .................... B01J 29/08; B01J 29/16
[52] U.S. Cl. ....................... 502/66; 502/65; 502/79
[58] Field of Search ................ 502/65, 66, 79

[56] References Cited

U.S. PATENT DOCUMENTS

| | | | |
|---|---|---|---|
| 4,097,365 | 6/1978 | Ward | 208/111 |
| 4,419,271 | 12/1983 | Ward | 502/65 |
| 5,070,053 | 12/1991 | Culross et al. | 502/64 |

FOREIGN PATENT DOCUMENTS 0070824 2/1983 European Pat. Off. .
0247679 12/1987 European Pat. Off. .

*Primary Examiner*—Carl F. Dees

[57] ABSTRACT

An improved hydroconversion process, particularly a hydrocracking process, employs a supported catalyst containing metals of Group VI and/or VIII. The catalyst support comprises a crystalline aluminosilicate of the zeolite Y type, a binder and a dispersion of silica-alumina in an alumina matrix. The catalyst support composition comprises less than 25% by weight of the zeolite material, more than 25% by weight of the binder and at least 30% by weight of the dispersion.

10 Claims, No Drawings

The quantities of hydrogenation metal components in the catalyst composition are suitably from about 0.5% by weight to about 10% by weight of the Group VIII metal component present and from about 2% by weight to about 40% by weight of Group VI metal component, each calculated as metal based on total catalysts. The hydrogenation metal components of the catalyst composition are suitably present in an oxidic form or in a sulfidic form or mixtures of oxidic and sulfidic forms. Preferably the hydrogenation metal components are in a sulfidic form, and if the catalyst composition contains a mixture of Group VI and Group VIII oxides, the composition will typically be subjected to a conventional sulfiding treatment prior to use in a hydrocracking process.

The hydroprocessing process of the invention in the conversion of hydrocarbon oils of relatively high average molecular weight and average boiling point in the presence of hydrogen to materials of lower average molecular weight and lower average boiling point by contacting the hydrocarbon oil at hydroprocessing conditions in the presence of molecular hydrogen and the supported catalyst composition.

The hydrocarbon oils employed as feedstocks for the process of the invention are gas oils, deasphalted oils, coker gas oils and other thermally cracked gas oils. Such cracked gas oils are conventionally produced from crude oils, shale oils, tar sands and biomass as well as from syncrudes.

The preferred hydroprocessing process of the invention, i.e., the hydrocracking process, operates at conditions including at elevated temperature and pressure. Suitable temperatures are from about 250° C. to about 500° C., preferably from about 300° C. to about 450° C. The partial pressure of hydrogen employed is up to about 300 bar with good results being obtained at partial hydrogen pressures from about 25 bar to about 200 bar. The gas to feedstock ratio is usefully from about 100 Nl/kg to about 5000 Nl/kg although ratios from about 250 Nl/kg to about 2000 Nl/kg are more often utilized. The process is operated at a space-velocity of from about 0.1 kg to about 10 kg of feed per liter of catalyst, preferably from about 0.2 kg to about 5 kg of feed per liter of catalyst.

In operation, it is often useful to subject part or all of the feedstock to one or more hydrotreating processes prior to application of the hydroconversion process of the invention. In such a pre-treatment, the catalyst is suitably an amorphous alumina-containing hydrocracking catalyst containing at least one metal of Group VIB and/or at least one metal of Group VIII. In a modification employing this pre-treatment, use is made of two reaction zones arranged in series. In the first zone, the feed encounters the amorphous catalyst and hydrogen to effect a preliminary hydrocracking. The effluent from the first reaction zone then passes to the second reaction zone where, in the presence of hydrogen, the effluent encounters the supported catalyst composition of the invention.

The hydrocracking process of the invention results in the efficient production of lighter materials such as middle distillates from the heavier gas oil feedstocks.

The present invention will now be illustrated by means of the following Illustrative Embodiment which should not be regarded as limiting.

Illustrative Embodiment

A catalyst according to the present invention was prepared by mixing 460 g of a commercially available modified Y zeolite having a unit cell size of 2.434 nm, a $SiO_2/Al_2O_3$ molar ratio of 9.3, a water adsorption capacity (at 25° C. and a $p/p_o$ value of 0.2) of 12.5% by weight, a nitrogen pore volume of 0.45 ml/g wherein 26% of the total pore volume is made up of pores having a diameter of at least 8 ran and a loss of ignition of 13% by weight with 8920 g of an amorphous 45/55 silica-alumina (ex-Criterion) and 4110 g of hydrated aluminum oxide (ex-Criterion). To this mixture was added water and 500 g of acetic acid. After mulling, the mixture was further mixed with 300 g of a conventional extrusion aid. The resulting mixture was extruded and the extrudates obtained were dried, while rotating for about 4 hours at 250° C. and then calcined for 3 hours at 600° C. The extrudates obtained had a water pore volume of 0.786 ml/g and a diameter of 1.65 run. The resulting catalyst support contained 4% by weight of modified Y zeolite, 30% by weight of binder and 66% by weight of the dispersion of silica-alumina in alumina, on a dry basis. A nickel/tungsten solution was made up containing 400 g of nickel nitrate solution (14% by weight of nickel) and 670 g of ammonium tungstate (39.8% by weight of tungsten). The nickel/tungsten solution was diluted with water to 760 ml and used to impregnate 1 kg of the extrudates produced above. After homogenizing the impregnated extrudates for 1 hour using a mixer, the extrudates were dried, while rotating for about 4 hours at 250° C. and then calcined at 450° C. for 2 hours. The impregnated extrudates contained 3.9% by weight of nickel and 18.9% by weight of tungsten.

The catalyst produced above was subjected to a hydrocracking performance test involving a hydrotreated heavy vacuum gas oil having the following properties:

C (% wt): 86.28
H (% wt): 13.70
S (ppm): 79
N (ppm): 15
d (70/4): 0.8496
pour point (° C.): 44
I.B.P. (° C.): 344
10% wt rec.: 384
20% wt rec.: 412
30% wt rec.: 428
40% wt rec.: 446
50% wt rec.: 462
60% wt rec.: 483
70% wt rec.: 502
80% wt rec.: 526
90% wt rec.: 559
F.B.P.: greater than 620

The catalyst was subjected before use to a presulfiding treatment of slowly heating in a 5% v $H_2S/H_2$-atmosphere to a temperature of 370° C. The catalyst was tested in a 1:1 dilution with 0.1 mm SiC particles under the following operating conditions: WHSV of 1.5 kg/l/h, $H_2S$ partial pressure of 2.5 bar, total pressure of 140 bar and a gas/feed ratio of 1500 Nl/kg. The experiment was carried out in once-through operation. The catalyst performance was a 65% by weight conversion of 370° C.+ boiling point material in the feed, after

HYDROCARBON CONVERSION CATALYST

FIELD OF THE INVENTION

The present invention relates to hydrocarbon conversion processes and to catalyst supports and supported catalysts useful therein.

BACKGROUND OF THE INVENTION

A number of hydroconversion processes are well known in the art. One of these, hydrocracking, is becoming increasingly important since it provides hydrocarbon product of good quality with considerable flexibility of product type. A specific use of hydrocracking processes and the catalysts useful therein is the conversion of rather heavy hydrocarbon feedstocks to more useful products of lower molecular weight. Historically, catalytic hydrocracking was used to increase the production of relatively low boiling materials such as gasoline. More recently, however, hydrocracking is also employed in the production of middle distillates.

To obtain hydrocracking catalysts particularly useful in processes for production of middle distillates, catalysts have been developed based on zeolite materials as modified by techniques such as ammonium ion-exchange and calcination to improve the performance of the zeolite catalysts.

One zeolite considered to be a good precursor of hydrocracking catalysts is the well-known synthetic zeolite Y as described by U.S. Pat. No. 3,130,007. Proposed modifications of this zeolite include the production of ultrastable Y (U.S. Pat. No. 3,536,605) and ultrahydrophobic Y (Great Britain patent No. 2,014,970). In general, such modifications, depending in part upon the particular treatment involved in the modification, result in a reduction of the unit cell size of the zeolite.

In European patent No. B-70,824 there are described hydrocracking catalysts based on a specific type of ultrahydrophobic Y zeolite, particularly a zeolite known as LZ-10. The catalyst support for these catalysts, in addition to specific zeolites having a characteristic water adsorption capacity of less than 8% by weight based on the zeolite, contains a dispersion of silica-alumina particles in a gamma-alumina matrix and no more than a small amount of a binder. The catalysts produced from these supports are said to be an improvement over the non-zeolitic catalysts containing a similar dispersion disclosed in U.S. Pat. No. 4,097,365. It would be of advantage, however, to have hydroprocessing catalysts which provide improved selectivity and stability, as compared to conventional hydrocracking catalysts, while substantially maintaining the activity of the known catalysts.

SUMMARY OF THE INVENTION

The present invention provides improved hydroprocessing processes as well as improved hydroprocessing catalysts and supports therefor. More particularly, the invention provides improved hydrocracking processes for the production of middle distillates and improved hydrocracking catalysts and hydrocracking support composition. The catalyst support compositions comprise a crystalline aluminosilicate of the zeolite Y type, a binder and a dispersion of silica-alumina in an alumina matrix. The support compositions are further characterized by a proportion of the zeolite material of less than 25% by weight based on total support, a proportion of binder of more than 25% by weight based on total composition and at least 30% of the dispersion, on the same basis.

BACKGROUND OF THE INVENTION

The hydroprocessing process of the invention utilizes a catalyst based on a catalyst support composition containing a crystalline aluminosilicate of the zeolite Y type, a binder and a dispersion of silica-alumina in an alumina matrix in specified proportions. The zeolite Y material is present as less than 25% by weight of the total support composition and preferably is less than 15% by weight of the total composition. The binder present in the catalyst support composition comprises at least 30% by weight of the total composition. Good results are obtained if the weight ratio of binder to zeolite Y material is from about 2 to about 40. The dispersion, a dispersion of silica-alumina in an alumina matrix, preferably a gamma-alumina matrix, is at least 30% by weight of the total composition and preferably is from about 40% by weight to about 70% by weight of the total composition. The catalysts produced from the catalyst support compositions are broadly useful in hydroconversions but are particularly useful in hydrocracking processes.

The binder of the catalyst support compositions is an inorganic oxide or mixture of inorganic oxides, either crystalline or amorphorus. Illustrative binders are magnesia, alumina, titania or the materials conventionally known as clays. Other inorganic oxides such as zirconia and silica are optionally also present. The preferred binder for the catalyst support compositions of the invention is alumina.

The catalyst support composition component of the zeolite Y type is a modified zeolite crystalline aluminosilicate having a unit cell size below about 2.5 nm, a degree of crystalinity which is at least retained through increasing silica/alumina ratios, a water adsorption capacity (at 25° C. and a $p/p_o$ value of 0.2) of at least 8% by weight of the modified zeolite and a pore volume of at least 0.25 ml/g, wherein from about 10% to about 60% of the total pore volume is in pores having a diameter of at least 8 nm. This type of modified Y zeolite is well known and is described in detail in European patent No. B-247679, incorporated herein by reference. Preferred catalyst support compositions contain zeolite with from about 10% to about 40% of the total pore volume of the modified zeolite Y present in pores having a diameter of at least 8 nm, a water adsorption capacity of from about 8% by weight to about 10% by weight of the zeolite and a silica/alumina ratio of from 4 to 25, particularly from about 8 to about 15.

The catalyst support compositions are produced by conventional methods as by mulling the catalyst support composition components with water, extruding the resulting mixture and drying and calcining the extrudate. The hydrocracking catalysts of the invention comprise, supported on the catalyst support composition, a catalyst comprising at least one hydrogenation metal component of a metal of Group VI of the Periodic Table of Elements with or without at least one hydrogenation metal component of a metal of Group VIII of the Periodic Table. The catalyst composition typically contains at least one metal of nickel or cobalt. Preferred catalyst compositions additionally contain at least one of molybdenum or tungsten or at least one of platinum or palladium.

allowing the catalyst to stabilize. The following results were obtained with the catalyst:

Temperature required (65% conv. of 370° C.+): 370° C.

Middle distillate selectivity (% wt): 61

From the above, attractive results are obtained with a catalyst containing a small amount of zeolitic component and a large amount of binder.

What is claimed is:

1. A composition useful as a catalyst support which comprises a crystalline aluminosilicate of the zeolite Y type having a water absorption capacity of at least 8% by weight of crystalline aluminosilicate, an inorganic oxide binder and a dispersion of silica-alumina in an alumina matrix, wherein the aluminosilicate is less that 25% by weight of the total composition, the binder is more than 25% by weight of the total composition and the dispersion is greater than 30% by weight of the total composition.

2. The composition of claim 1 wherein the binder is at least 30% by weight of the total composition.

3. The composition of claim 1 wherein the aluminosilicate is less than 15% by weight of the total composition.

4. The composition of claim 3 wherein the binder is magnesia, alumina, titania or mixtures thereof, optionally with zirconia or silica also present.

5. The composition of claim 4 wherein the aluminosilicate has a unit cell below 2.5 nm, a water adsorption capacity of at least 8% by weight based on aluminosilicate and a pore volume of at least 0.25 ml/g wherein from about 10% to about 60% of the total pore volume is in pores having a diameter of at least 8 nm.

6. The composition of claim 5 wherein the aluminosilicate has a silica/alumina ratio of from 4 to 25.

7. A supported catalyst composition comprising at least one metal hydrogenation component of Group VI metal with or without at least one metal hydrogenation catalyst component of Group VIII metal, the components being in oxidic or sulfidic form, supported on the composition of claim 1.

8. The catalyst composition of claim 7 wherein the Group VIII metal hydrogenation component is at least one of nickel and cobalt.

9. The catalyst composition of claim 8 wherein the Group VI metal hydrogenation component additionally is at least one of molybdenum and tungsten and any Group VIII metal component comprises at least one of platinum and palladium.

10. The catalyst composition of claim 9 wherein metal hydrogenation component is present in sulfidic form.

* * * * *